United States Patent
Odagawa et al.

(10) Patent No.: US 6,975,938 B2
(45) Date of Patent: Dec. 13, 2005

(54) DRIVING PLAN PRODUCING DEVICE AND METHOD, AND NAVIGATION APPARATUS

(75) Inventors: Satoshi Odagawa, Tsurugashima (JP); Yasuteru Kodama, Tsurugashima (JP); Motohiko Takayanagi, Tokyo-to (JP); Motoyuki Yamashita, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/164,596

(22) Filed: Jun. 10, 2002

(65) Prior Publication Data

US 2002/0188399 A1    Dec. 12, 2002

(30) Foreign Application Priority Data

Jun. 11, 2001   (JP)   ............................ 2001-175180

(51) Int. Cl.[7] .......................... G06G 7/78; G01C 21/32
(52) U.S. Cl. ...................... 701/202; 701/208; 340/988
(58) Field of Search .......................... 701/201, 208, 701/211, 206, 207, 213, 202, 209, 200, 210; 340/988, 990

(56) References Cited

U.S. PATENT DOCUMENTS

| | | | | |
|---|---|---|---|---|
| 5,751,228 A | * | 5/1998 | Kamiya et al. ............. 340/988 |
| 5,938,720 A | * | 8/1999 | Tamai ......................... 701/209 |
| 5,948,040 A | | 9/1999 | DeLorme et al. ........... 701/201 |
| 6,154,658 A | * | 11/2000 | Caci ........................... 455/466 |
| 6,202,024 B1 | | 3/2001 | Yokoyama et al. .......... 701/207 |
| 6,216,086 B1 | * | 4/2001 | Seymour et al. ............ 701/202 |
| 6,263,276 B1 | * | 7/2001 | Yokoyama et al. .......... 701/207 |
| 6,278,938 B1 | * | 8/2001 | Alumbaugh ................. 701/208 |
| 6,314,577 B1 | * | 11/2001 | Pocock ........................ 725/93 |
| 6,333,702 B1 | * | 12/2001 | Hiyokawa et al. ........ 340/995.21 |
| 6,516,269 B2 | * | 2/2003 | Takeuchi ..................... 701/211 |
| 6,615,131 B1 | * | 9/2003 | Rennard et al. ............. 701/200 |

FOREIGN PATENT DOCUMENTS

EP       1 087 316 A2       3/2001

* cited by examiner

Primary Examiner—Thomas G. Black
Assistant Examiner—Dalena Tran
(74) Attorney, Agent, or Firm—Sughrue Mion, PLLC (57) ABSTRACT

A drive plan producing device includes a contents database for storing associated data including geographical point names for a plurality of contents, a base contents determining unit which determines base contents used in a drive plan producing process based on an input by a user, a candidate place determining unit which refers to the contents database to determine the geographical point name associated with the base contents as a candidate place of driving, and a presenting unit which presents the determined candidate place to the user. Based on the input by the user, certain contents are determined as base contents. The base contents are used as a base for the production of the drive plan. By referring to the contents database, the geographical point name associated with the base contents is obtained, and it is determined as the candidate place and presented to the user. The user can select a drive plan by selecting one of the candidate places.

17 Claims, 4 Drawing Sheets

DRIVING PLAN PRODUCING DEVICE AND METHOD, AND NAVIGATION APPARATUS

BACKGROUND OF THE INVENTION

1. Field of the Invention

The present invention relates to a technical field of an on-vehicle electronic system including an on-vehicle information output device, such as a car audio device, and an on-vehicle navigation device.

2. Description of Related Art

Recently, a car navigation apparatus has been broadly used. A recent car navigation apparatus employs, not only the basic function of displaying map information to a user, but also so-called route search function and route guiding function. Therefore, the car navigation apparatus can search for a travel route to a destination based on the map data and offer the route guidance to the destination when the user inputs the destination. By simply driving the car along the travel route offered by the navigation apparatus, the user can reach the destination without losing the way, even if the destination is unknown place to the user.

Generally, when a user drives a car for either the business purpose or the private purpose, the destination has already been determined and the user travels to the destination. However, in a certain case (perhaps in many cases in a private travel), the user feels like driving somewhere although the specific destination is not on his or her mind. In such a case, the user would determine the drive plan according to his or her feeling on that day.

However, if the user does not have much geographical knowledge to some places to travel, it is difficult for the user to make up the drive plan, and hence the user is generally inclined to repeatedly travel only some limited places that he or she is familiar with.

SUMMARY OF THE INVENTION

The present invention has been made in consideration of the above points, and it is an object of the present invention to offer the user a drive plan that matches the user's feeling at that time based on the contents such as music and video selected by the user.

First, the basic concept of the present invention will be described. Music is one of the factors that a user regards important when he or she drives. Particularly, when a user drives in a private time, the user selects music of various genre and feeling and enjoys listening to them during the driving. In this view, the selection of music by the user appropriately reflects the user's feeling on that day. Therefore, if the user wants to drive somewhere according to the feeling on that day, determining the drive plan in consideration of the music that the user selected may provide a drive plan that appropriately reflects the feeling of the user. In the present invention, based on the above concept, a recommended drive plan is produced in consideration of the music selected by the user and presented to the user.

According to one aspect of the present invention, there is provided a drive plan producing device including: a contents database which stores associated data including geographical point names for a plurality of contents; a base contents determining unit which determines a base contents used in a drive plan producing process based on an input by a user; a candidate place determining unit which refers to the contents database to determine the geographical point name associated with the base contents as a candidate place of driving; and a presenting unit which presents the determined candidate place to the user.

In accordance with the drive plan producing device thus configured, based on the input by the user, certain contents are determined as base contents. The base contents are used as a base for the production of the drive plan. By referring to the contents database, the geographical point name associated with the base contents is obtained, and it is determined as the candidate place and presented to the user. The user can select a drive plan by selecting one of the candidate places.

The drive plan producing device may further include a receiving unit which receives a drive condition inputted by the user; and an extracting unit which extracts only the candidate place that satisfies the drive condition inputted by the user. By this, out of the plurality of candidate places thus determined, the restriction is made based on the drive condition inputted by the user to extract only the candidate places that the user desires.

In a preferred embodiment, the drive condition may include a driving time that the user inputs. By this, the candidate place, that is within the time range of driving that the user inputs, is presented to the user.

In another preferred embodiment, the drive condition may include at least one of a condition relating to a driving history of a user's car and a condition relating to taste of the user. By this, the candidate places can be restricted according to the condition relating to the driving history of the user's car and/or the user's taste.

The contents database may store abstract point names associated with the contents, the drive plan producing device may further include a point table describing correspondences between the abstract point names and the geographical point names, and the candidate place determining unit may obtain the geographical point name corresponding to the abstract point name associated with the base contents from the point table and include the geographical point name thus obtained to the candidate places. By this, the candidate place can be obtained based on the abstract point names stored in association with the contents.

The contents database may store artist names associated with the contents, the drive plan producing device may further include an artist database which stores artists and geographical points associated with the artists, and the candidate place determining unit may obtain the geographical points corresponding to the artist associated with the base contents from the artist database and include the geographical points thus obtained to the candidate places. Thus, the candidate place can be obtained based on the artist associated with the base contents.

The drive plan producing device may further include a tour plan table representing correspondences between the candidate places and tour plans preset for areas around the candidate places, and a unit which obtains the tour plan corresponding to the candidate place determined by the candidate place determining unit from the tour plan table and including the tour plan into the candidate places. Thus, if a tour plan exists for the candidate place obtained based on the base contents, the tour plan is also presented to the user.

The drive plan producing device may further include a unit which produces a tour plan including a plurality of candidate places, that exist in a predetermined range, out of the plurality of candidate places determined by the candidate place determining unit, and which represents the tour plan thus produced to the user. By this, the tour plan is automatically produced to cover the plurality of candidate places obtained based on the base contents within a predetermined range and the tour plan is presented to the user. Therefore, the user can obtain the tour plant hat travels the plural candidate places matching the base contents.

According to another aspect of the present invention, there is provided a navigation apparatus including: a drive plan producing device; a unit which receives a designation of one candidate place by a user and searches for a route to the designated candidate place; and a unit which provides the user with a route guidance according to the searched route, wherein the drive plan producing device includes: a contents database which stores associated data including geographical point names for a plurality of contents; a base contents determining unit which determines a base contents used in a drive plan producing process based on an input by the user; a candidate place determining unit which refers to the contents database to determine the geographical point name associated with the base contents as a candidate place of driving; and a presenting unit which presents the determined candidate place to the user.

In accordance with the navigation apparatus, the route to one candidate place that the user designates from the plural candidate places obtained based on the base contents is searched for, and the route guidance is provided to the user. Therefore, the user can easily drives to the candidate place that he or she has designated.

According to still another aspect of the present invention, there is provided an on-vehicle electronic system including: a drive plan producing device; a contents reproducing unit which reproduces contents selected by a user, wherein the drive plan producing device includes: a contents database which stores associated data including geographical point names for a plurality of contents; a base contents determining unit which determines a base contents used in a drive plan producing process based on an input by the user; a candidate place determining unit which refers to the contents database to determine the geographical point name associated with the base contents as a candidate place of driving; and a presenting unit which presents the determined candidate place to the user, and wherein the base contents determining unit determines the contents, that the contents reproducing unit is reproducing when the user inputs a drive plan producing instruction, as the base contents.

In accordance with the on-vehicle electronic system, the candidate place for driving can be determined based on the contents being reproduced when the drive plan is produced.

According to still another aspect of the present invention, there is provided a drive plan producing method to be executed by a navigation device having a contents database for storing associated data including geographical point names for a plurality of contents, the method including the steps of: determining a base contents used in a drive plan producing process based on an input by a user; referring to the contents database to determine the geographical point name associated with the base contents as a candidate place of driving; and presenting the determined candidate place to the user.

In accordance with the drive plan producing method, based on the input by the user, certain contents are determined as base contents. The base contents are used as a base for the production of the drive plan. By referring to the contents database, the geographical point name associated with the base contents is obtained, and it is determined as the candidate place and presented to the user. The user can select a drive plan by selecting one of the candidate place.

According to still another aspect of the present invention, there is provided a program storage device readable by a computer, tangibly embodying a program of instructions executable by the computer to control the computer to function as the above drive plan producing device.

According to still another aspect of the present invention, there is provided a computer data signal embodied in a carrier wave and representing a series of instructions which cause a computer to function as the above drive plan producing device.

It is noted that, in the present invention, "contents" include audio information such as music piece, video information such as movie and text information such as phrases and sentences.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings. The embodiment as described below is an example wherein the present invention is applied to a non-vehicle electronic system, and music information is used as contents in the drive plan producing process.

[1] Configuration of On-vehicle Electronic System

Figure 1:
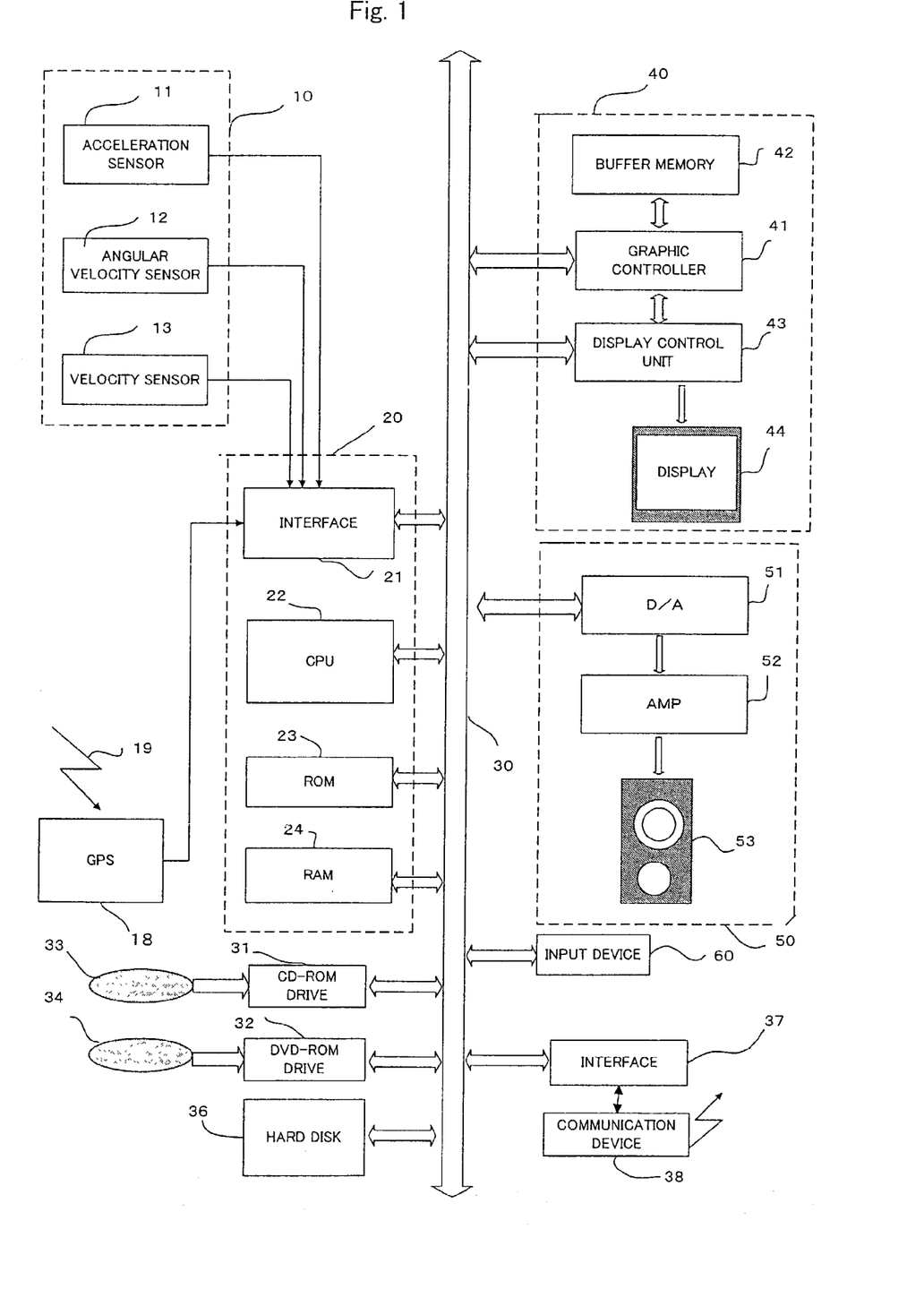
FIG. 1 is a block diagram showing a configuration of an on-vehicle electronic system according to an embodiment of the present invention.

First, an on-vehicle electronic system according to an embodiment will be explained with reference to FIGS. 1 to 3. FIG. 1 is a block diagram showing the on-vehicle electronic system according to the embodiment of the present invention.

As shown in FIG. 1, the on-vehicle electronic system according to the present embodiment includes a stand-alone navigation device 10, a GPS receiver 18, a system controller 20, a CD-ROM drive 31, a DVD-ROM drive 32, a hard disk unit 36, a communication interface 37, a communication device 38, a display unit 40, a sound output unit 50 and an input device 60.

The stand-alone navigation device 10 includes an acceleration sensor 11, an angular velocity sensor 12 and a velocity sensor 13. The acceleration sensor 11 is formed of, for example, a piezoelectric device, and detects an acceleration of a vehicle and outputs acceleration data. The angular velocity sensor 12 is formed of, for example, a vibration gyroscope, and detects an angular velocity of a vehicle at the time of direction change of the vehicle, and outputs angular velocity data and relative bearing data.

The velocity sensor 13 is formed of a vehicle velocity sensor which detects rotation of an axle of a vehicle mechanically, magnetically or optically, and generates a vehicle velocity pulse which is a pulse signal, for every rotation for a predetermined angle of the axle.

The GPS receiver 18 receives an electric wave 19 carrying downstream line data including data for positioning, from a plurality of GPS satellites to be used for detecting an absolute position of the vehicle according to latitude and longitude information and the like.

The system controller 20 includes an interface 21, a CPU (Central Processing Unit) 22, a ROM (Read Only Memory) 23 and a RAM (Random Access Memory) 24, and is configured to control the entire on-vehicle electronic system.

The interface 21 carries out interface operation with the acceleration sensor 11, the angular velocity sensor 12 and the velocity sensor 13 so as to input, to the system controller 20, the acceleration data, the relative bearing data, the angular velocity data, the GPS positioning data, the absolute bearing data and the like in addition to a vehicle velocity pulse. The CPU 22 controls the entire system controller 20. The ROM 23 has a non-volatile memory or the like (not shown) in which control programs or the like for controlling the system controller 20 is stored. The RAM 24 stores various data such as route data entered in advance by a user via the input device 60, in a readable manner, and provides a working area for the CPU 22.

The system controller 20, the CD-ROM drive 31, the DVD-ROM drive 32, the hard disk unit 36, the communication interface 37, the display unit 40, the sound output unit 50 and the input device 60 are connected with each other via a bus line 30.

The CD-ROM drive 31 and the DVD-ROM drive 32 read out, under the control of the system controller 20, various data such as road data including number of lanes and road width, as well as control programs corresponding to the respective embodiments as will be described later, from a CD 33 and a DVD 34, respectively, and out put the same. It should be appreciated that the CD-ROM drive 31 and the DVD-ROM drive 32 may be provided solely, or a CD/DVD compatible drive may be provided.

The hard disk unit 36 stores sound data or video data or data for navigation including map data and the like read from the CD-ROM drive 31 or the DVD-ROM 32. As a result of this, for example, it becomes possible to read out and output sound data or video data stored in the hard disk unit 36 while carrying out navigation operation by reading out map data recorded on the CD-ROM 33 or the DVD-ROM 34. Alternatively, it becomes possible to read out and output map data stored in the hard disk unit 36 while reading out and outputting sound data and video data recorded on the CD-ROM 33 and the DVD-ROM 34. Furthermore, it becomes possible to read out and output, at a desired point of time, sound data and video data or map data and the like which has been downloaded by means of the communication device 38 and stored in the hard disk unit 36.

The communication device 38 is implemented by, for example, a cellular phone, and is configured to be able to download, via the communication interface 37 forming a modem or the like, sound data and video data or map data and the like, or the whole or a part of predetermined kinds of database related to the same.

The display unit 40 displays various kinds of display data under the control of the system controller 20. The display unit 40 includes a graphic controller 41 for controlling the entire display unit 40 based on control data sent from the CPU 22 via the bus line 30; a buffer memory 42 formed of a memory such as VRAM (Video RAM) and for temporarily storing image information which is ready for display; a display control unit 43 for controlling a display 44 such as liquid crystal or CRT (Cathode Ray Tube) display based on image data output from the graphic controller 41; and the display 44. The display 44 is implemented by a liquid crystal display or the like having a diagonal length of about 5 to 10 inches, for example, and is mounted in the vicinity of a front panel in a car. The display unit 40 can display TV images received via a TV antenna (not shown) and video data of a video DVD reproduced using the DVD-ROM drive 32, as well as map data for navigation.

The sound output unit 50 includes a D/A converter 51 for performing D/A (Digital to Analogue) conversion of digital sound data sent from the CD-ROM drive 31 or the DVD-ROM 32, or from the RAM 24 or the like via the bus line 30 under the control of the system controller 20; an amplifier (AMP) 52 for amplifying an analog sound signal output from the D/A converter 51; and a speaker 53 for converting the amplified analog sound signal to sound and outputting the sound to the interior of the car.

The input device 60 is configured by a key, a switch, a button, a remote-controller, a voice input device or the like. The input device 60 is disposed around the front panel of the main body of the on-vehicle electronic system mounted in the car or around the display 44.

As described above, in the on-vehicle electronic system according to the present embodiment, the navigation system is configured by the stand-alone navigation device 10, the GPS receiver 18, the system controller 20, the CD-ROM drive 31, the DVD-ROM drive 32, the hard disk unit 36, the communication interface 37, the communication device 38, the display unit 40, the sound output unit 50 and the input device 60 and the like. Also, the contents reproducing system is constructed by the system controller 20, the CD-ROM drive 31, the DVD-ROM drive 32, the hard disk unit 36, the communication interface 37, the communication device 38 the display unit 40, the sound output unit 50, the input device 60 and the like. That is, a plurality of constituents are shared by the navigation system and the contents reproducing system, which are centrally and wholly controlled as a unitary on-vehicle electronic system by the same system controller 20.

In addition, in the on-vehicle electronic system according to the embodiment, a music piece data base is configured in the hard disk unit 36. The music piece database stores a plurality of audio information used for playing back various music pieces, serving as examples of the content information, in a manner associated with attribute information such as a playing time, a playing artist and lyrics. Alternatively, the music piece database stores the attribute information such as a playing time, a playing artist and lyrics in a manner associated with the title of the respective music piece, for example. It is noted that, in addition to or alternatively to providing the music piece database in the hard disc unit 36, the system controller 20 may access to the music database formed in a remote server device via the communication device 38. It goes without saying that the on-vehicle electronic system may include various elements constituting an existing car audio system and a car TV system such as a radio antenna, a radio tuner, a TV antenna, a TV tuner, a cassette deck, a MD drive and the like, as well as the constituents illustrated in FIG. 1.

Data processing in the embodiment and the later-described embodiments are mainly executed in the CPU 22 shown in FIG. 1. More specifically, a computer program for controlling the navigation system, a computer program for controlling the contents reproducing system and a computer program for controlling database are mainly executed in the CPU 22. And, an AGENT having various functions as will be described later is also logically constructed in the CPU 22 by computer programs. These computer programs may be stored in the ROM 23, the CD-ROM 31 or the DVD-ROM 32, or may be downloaded to the RAM 42, the hard disk unit 36 and the like via the communication device 38 such as a modem and a cellular phone.

Next, the database (hereinafter abbreviated as "DB") used in the drive plan producing process according to the present invention will be described. FIGS. 2A and 2B show data structure of a music piece DB 100 and an artist DB 110, respectively, and FIGS. 3A and 3B shows data structure of a geographical point DB 120 and an abstract point DB 130, respectively, which are referred to in the drive plan procuring process described later. In this embodiment, those databases are formed in the hard disk unit 36 shown in FIG. 1.

The music piece DB 100 stores music piece data and associated data for various music pieces. Specifically, the music piece DB 100 stores a title 101, an artist 102, a genre 103, geographical point names 104, abstract point names 105 and a keyword 106 as well as music piece data 107 of each music piece. The title 101 represents the name of the music piece, and the artist 102 represents the artist (a singer, a band or a group) of the music piece. The genre 103 represents a music genre (e.g., pops, rock, jazz, fusion, etc.) of the music piece.

The geographical point name 104 directly represents the geographical place associated with the music piece, and place names such as "Shinjuku", "Shibuya", "Kyoto" maybe used. The abstract point name 105 directly or indirectly represents a geographical place, and words expressing geographic feature such as an avenue, an alley or a beach may be used. It is noted that the geographical point name and the abstract point name may be extracted from the lyrics of the music piece. Namely, the place names appearing in the lyrics of the music piece, such as "Tokyo", "Osaka" or the abstract point name such as "beach", "shore", "lighthouse", may be included in the music piece DB 100 as the geographical point name or the abstract point name.

The keyword 106 is a word that the user has registered for the music piece. For example, the user may register a word "sea" if the user have an image of sea for a certain music piece, and may register a word expressing a memory or an expression of the days when the user was frequently listening to the music piece. For example, the user may register a word "Graduation" for a certain music piece that the user was frequently listening to the music piece at the time of his or her graduation. It is noted that the registration of the keywords may be carried out in such away that the user instructs the key word registration function for a music piece by manipulating the on-vehicle electronic system shown in FIG. 1 and then inputs the keyword with the designation of a music piece subject to the registration. Thus, the keyword is stored in the music piece DB 100 in the hard disk unit 36.

The music piece data 107 is digital audio data to be reproduced by the audio output unit 50 of the on-vehicle electronic system shown in FIG. 1, and stored in the music piece DB 100 after predetermined compressive-encoding process is applied.

Figure 2A:
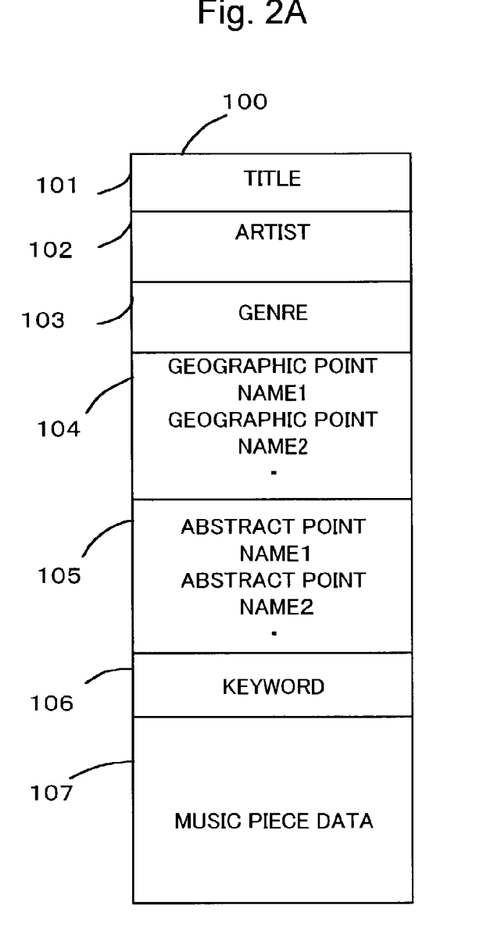
FIGS. 2A and 2B are diagrams schematically showing data structure of a music piece database and an artist database according to the embodiment of the present invention.
Figure 2B:
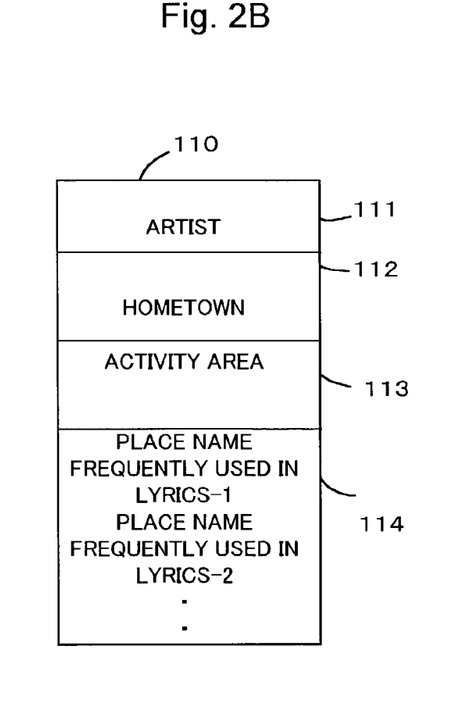

On the other hand, the artist DB 110 shown in FIG. 2B stores the associated data for each artist, and specifically includes an artist 111, a hometown 112, an activity area 113, and place names 114 frequently used in lyrics. The artist 111 is the same as the artist 102 stored in the music piece DB 100, and may be an artist code identical to the artist code stored in the music piece DB 100. The hometown 112 represents the hometown or birthplace of the artist, and the activity area 113 represents the place where the artist frequently performs live, concert, studio recording or other activities. The place names 114 are the place names which frequently used in the lyric of the music piece of that artist.

Figure 3A:
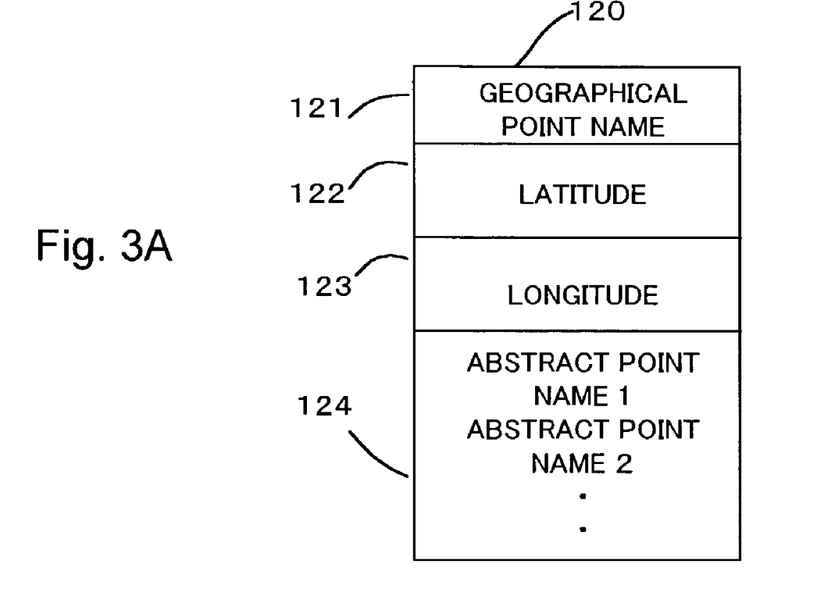
FIGS. 3A and 3B are diagrams schematically showing data structure of a geographic point database and an abstract point database according to an embodiment of the present invention.

The geographical point DB 120 shown in FIG. 3A stores the correspondences between the geographical point names and abstract point names, and functions as a kind of look-up table. Specifically, the geographical point DB 120 stores a point name 121, a latitude 122 and a longitude 123 of the geographical point, and abstract point names 124 associated with the geographical point names. The geographical point name 121 is the same data as the geographical point name 104 in the music piece DB 100, and the abstract point name 124 is the same data as the abstract point name 105. Therefore, by referring to the geographical point DB 120, the geographical point name can be obtained from the abstract point name. Since the abstract point name is an abstract concept such as "avenue" or "beach", the on-vehicle electronic system can obtain the specific geographical point name corresponding to the abstract point name by referring to the geographical point DB 120.

It is noted that, in place of the geographical point DB 120, the abstract point DB 130 may be used. The abstract point DB 130 is configured to store the corresponding geographical point names for the abstract point names, and can be used, similarly to the geographical point DB 120, to obtain the geographical point name from the abstract point name.

Next, the brief description will be given of the manner to obtain those data. The title 101, the artist 102 and the music piece data 107 for each music piece in the music piece DB 100 can be obtained from a general music source such as a Compact Disc, a DVD (Digital Versatile Disc) or Mini Disc. Alternatively, those data may be obtained from a music supplying server supplying music data to the user via a network such as the Internet. In that case, the user can access to the music supplying server via a personal computer in user's home to download the music data, and then store the music data into the music piece DB 100 of the hard disk unit 36 by using a storage medium such as CD-R or DVD. Alternatively, the user may connect to the music supplying server via the communication device 38 in the on-vehicle electronic system shown FIG. 1 to download the music data and store them into the hard disk unit 36.

The data of the geographical point name and the abstract point name in the music piece DB 100 are produced by determining the associated geographical point names and the abstract point names for each music piece and forming the database structure of those data. Such a database may be provided by a manufacturer or a dealer of the on-vehicle electronic system, or a seller of music sources such as CD. In addition, those data may be downloaded from a certain server on the Internet and stored in the hard disk unit 36. In that case, the user may connect to the server and store those data into the hard disk unit 36 via a storage medium such as a DVD, or may access to the server via the communication device 38 shown in FIG. 1 to download and store the music data into the hard disk unit 36. Further, the geographical point names and the abstract point names may be recorded on a blank space on the CD to be put on the market.

Similarly, the respective data in the artist DB 110 may be obtained from an external source such as a database of the music source seller and the like. In addition, the respective data of the geographical point DB 120 and the abstract point DB 130 may be provided by a provider of the map data for the navigation apparatus in the form of a storage medium. For example, the geographical point DB and the abstract point DB may be recoded on a DVD in addition to map data, and the DVD may be provided to the user.

Figure 3B:
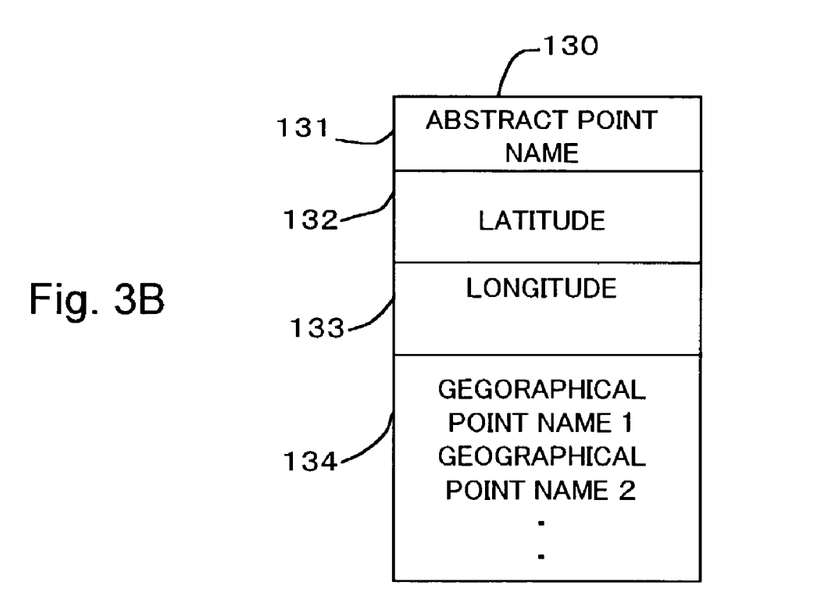

Accordingly, among the data stored in the databases shown in FIGS. 2 and 3, the data other than the keyword 107 in the music piece DB 100 (this is registered by the user) may be obtained from external databases in various way to be stored in the hard disk unit 36.

It is noted that, while each DB is illustrated to have only one record (the music piece, the artist, the geographical point name and the abstract point name) in FIGS. 2 and 3, actually the DB, of course, includes data for many records.

[2] Drive Plan Producing Process

Figure 4:
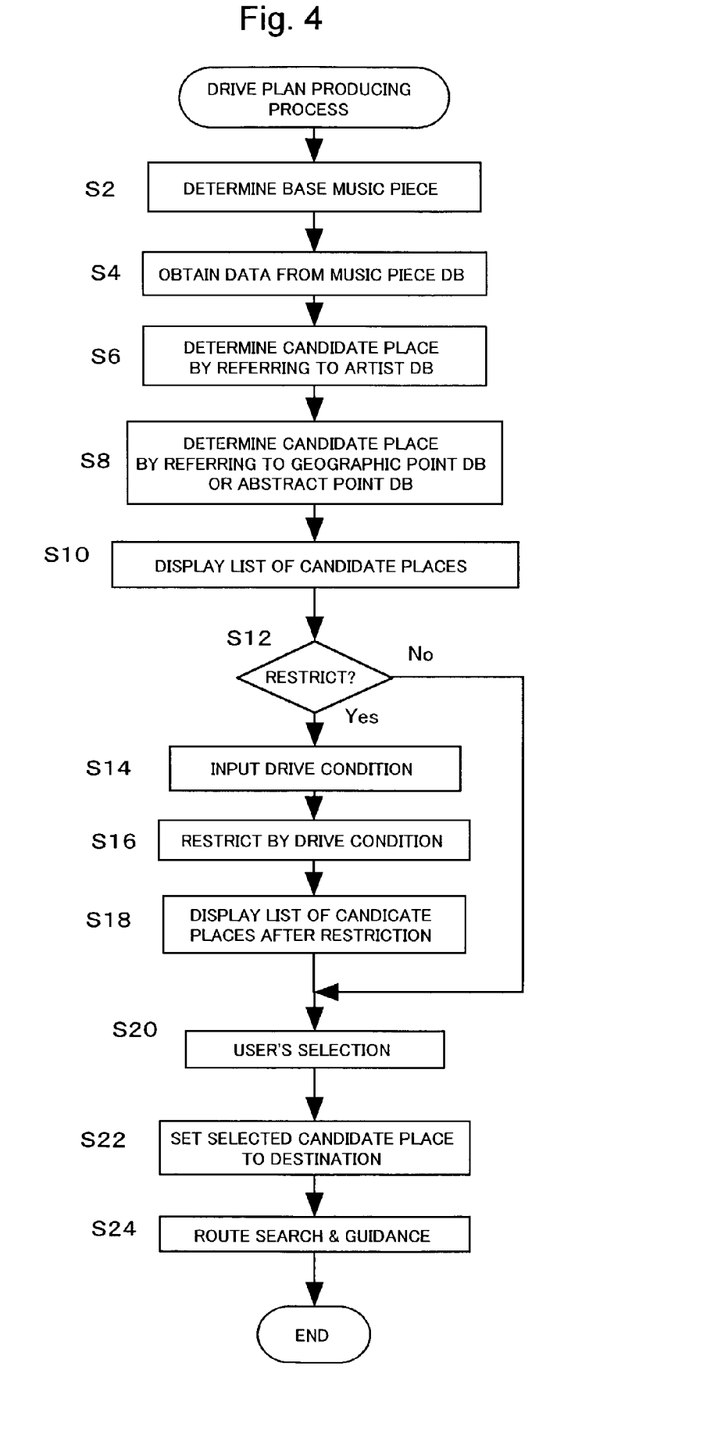
FIG. 4 is a flowchart showing a drive plan producing process according to the present invention.

Next, by referring to FIG. 4, the drive plan producing process according to the present invention will be described. FIG. 4 is a flowchart of the drive plan producing process. This process is executed by the AGENT which loads the drive plan producing program stored in the ROM 23, the hard disk unit 36, the CD-ROM 33 or the DVD-ROM into the RAM 34 and executes the program. It is noted that the AGENT is an imaginary controller realized by the CPU 22 and the programs to be executed by the CPU 22. The following description will be made such that the drive plan producing process is executed under the control of the AGENT.

First, when a user in a car manipulates the input device 60, such as buttons on an operation panel, to select the drive plan producing mode, the AGENT determines a base music piece for producing plan. The "base music piece for producing plan" is a music piece which is used as a base for the driving plan production. One example of determining the base music piece is that the AGENT requests the user to select a music piece to be used for the plan production and sets the selected music piece as the base music piece. In an alternative example, the music piece being reproduced when the user selects the drive plan producing mode may be automatically set to the base music piece. In a still other example, if a history of music pieces that the user had listened to in the car (i.e., music selection history) is stored in the hard disk unit 36, a music piece that was frequently selected by the user may be automatically set to the base music piece (since the frequently selected music piece may be supposed to be the user's favorite one).

When the base music piece is determined, the AGENT refers to the music piece DB 100 to obtain the title, the artist, the genre, the geographical point name, the abstract point name and the keyword for the base music piece (step S4). The AGENT temporarily stores the geographical point name thus obtained into the RAM 24 as candidate places. Further, if the geographical point name has been associated with a certain genre, the AGENT stores the geographical point name in the RAM as a candidate place. Still further, if the geographical point name is included in the keywords 106 registered by the user, the geographical point name is also stored in the RAM 24 as a candidate place.

Then, the AGENT refers to the artist DB 110 to obtain the hometown, the activity area and the place name frequently used in the lyrics for the artist obtained in step S4, and stores them into the RAM 24 as candidate places (step S6). Further, the AGENT refers to the geographical point DB 120 or the abstract point DB 130 to obtain the geographical point names corresponding to the abstract point names obtained in step S4, and stores them into the RAM 24 as candidate places (step S8).

By the above steps, a plurality of geographical point names associated with the base music piece are stored in the RAM 24 as candidate places, and the AGENT controls the display unit 40 to display a list of those candidate places (step S10).

Then, the AGENT asks the user whether or not the restriction process of the candidate places is needed (step S12). Here, the restriction process makes the user input one or more drive condition if the list shown in step S10 includes many candidate places, and extracts only the candidate place that meets the drive condition inputted by the user.

If the user instructs the restriction process (step S12; Yes), the AGENT changes the mode to the drive condition input mode, and the user inputs the drive condition (step S14). Then, the AGENT extracts, out of the candidate places in the list shown in step S10, only the candidate places that meet the inputted drive condition (step S16), and shows the restricted list to the user (step S18).

The drive condition may include (1) a time for driving, (2) whether the user uses the travel history data or not, (3) the user's taste, and the like. For the time for driving, for example, if the user inputs "half day" or "2 hours" as the drive condition, only the candidate places to which the user can reach (or go and return) within the time are extracted. It is noted that, as the time for driving, the candidate places may be restricted to the places that the user can reach within the playing time of the music album being reproduced at that time.

As for whether the user uses the travel history data or not, if the travel history of the user's car is stored in the hard disk unit 36, for example, of the on-vehicle electronic system, they may be used as the drive condition. For example, based on the travel history, the user may designate whether the places that the user has visited are to be included or excluded, and the candidate places may be restricted according to the designation by the user. Further, the user may be enabled to determine that the candidate places in the area where the user has visited recently (e.g., within 6 months) are to be excluded. Still further, it is possible to empirically determine the user's activity area from the user's travel history and extract only the candidate places near to or far from the user's activity area.

The taste of the user may include a specific demand by the user such that the seaside is better, or the mountain area is not desirable, etc., and the candidate places may be restricted in consideration of those tastes of the user.

It is noted that, if the user does not instruct the restriction process in step S12, the list of the candidate places shown in step S10 is being continuously displayed.

Then, the user selects a desired candidate place from the list of the candidate places thus displayed (step S20). The AGENT sets the candidate place selected by the user to the destination (step S22), and searches for the route to the destination to start the route guidance (step S24). In this way, the user can obtain the list of the candidate places based on the base music piece for producing plan, and can select a desired candidate place to be set as the destination.

It is noted that, while the route search and the route guidance in step S24 is executed by referring to the map data based on a predetermined route search and guide program, those route search operation and route guidance operation are well known in the art and hence the description thereof will be omitted.

[3] Modification

In the above-described embodiment, eventually the list of the candidate places is presented to the user. In addition, if any tour plans including the candidate places are prepared in advance, such tour plans may be included in the list so that the user can select the tour plan. In order to enable this, a tour plan DB is prepared in which a table of the candidate places and the tour plans prepared in advance for the areas around the candidate places (e.g., a tour plan traveling the plural candidate places) are stored. The AGENT refers to the tour plan DB to obtain the tour plans, and includes the tour plans into the list of the candidate places that is presented to the user in steps S10 or S18.

Further, as an application related to the tour plan, if the plurality of candidate places in the list presented to the user include the candidate places which are located within a predetermined distance or which can be traveled within a predetermined time, a new tour plan traveling those plural candidate places one after another maybe automatically produced and included in the list to be presented to the user.

In the above-described embodiment, a part of the geographical point names and the abstract point names included in the music piece DB are extracted from the lyrics of the music piece in advance. Alternatively, a lyrics DB storing lyrics of the music pieces may be prepared and an inference engine may be used to extract the geographical point names or the abstract point names from the lyrics data to set the candidate places.

As the drive condition, in addition to the ones described above, a situational information at that time or at that place, e.g., the weather, the season or the time, and/or a personal information such as the taste, the family member, a member of people who are driving with may be used as the drive condition. The factors such as the weather, the season or the time may be statistically used for the decision factor of the candidate places to drive because generally those factors may influence feeling of the user and hence the decision of the area or place the user wants to visit. Therefore, the AGENT may be configured to receive the user's input of the weather, season or time, and restrict or determine the candidate places based on those factors. Further, as to the personal information of the user, the personal information may be statistically associated to certain areas (e.g., places which a couple or a family likes to visit) to determine the candidate place.

The above-described embodiment is directed to the case that the drive plan producing process is executed in the on-vehicle electronics system. However, by utilizing the communication device in the on-vehicle electronics system, it is possible to achieve the drive plan producing process by communicating the server on the Internet or the like. In that case, the AGENT (formed by the CPU 22 and the programs) formed in the on-vehicle electronics system may alternatively be formed in the server on the Internet, and thus the server is provided with the drive plan producing function. The inputs made on the user side, such as the decision of the base music piece for producing plan or the input of the drive condition may be transmitted to the server via the communication device 38, and the server may transmit the list of the candidate places to the on-vehicle electronic system to be displayed on the display 44. In addition, the on-vehicle electronic system may also perform the route search and/or the route guidance, after the destination is determined, by real time communication with the server via the communication device 38.

The present invention is applicable to not only an on-vehicle navigation apparatus, but also a so-called man navigation device utilizing a potable information terminal or a cellular phone if it has a music playback function. In that case, the navigation device may offer a drive plan that uses a train, a bus or other transportation. Namely, the drive plan in the present invention includes traveling means other than the user's car, and also includes a plan to walk all destinations.

In the above embodiment, an example of music piece is used. However, it is possible to prepare a database, similar to the music piece database, storing video information of movies that the user was watching or text information of an electronic book that the user was reading, and to produce the drive plan based on those contents information.

While the list of the candidate places are present to the user in the form of the list shown on the display 44 in the above embodiment, the candidate places may be presented to the user by voice message or the like.

It is to be understood that the present invention is not limited to the foregoing embodiments, and various changes are possible without departing from the scope and the spirit of the present invention readable from claims and the entire description, such changed forms being embraced in the technical range of the present invention. Therefore, a drive plan producing device and method, a navigation apparatus, an on-vehicle electronic system and computer programs therefore may be within the range of the present invention.

As described above, according to the present invention, the drive plan is produced based on the contents that the user designated or the contents that the user was enjoying. In many cases, the contents that the user designates or was enjoying appropriately reflect the user's feeling at that time, and hence the drive plan that matches the user's feeling may be offered.

The disclosure of Japanese Patent Applications No. 2001-175180 filed on Jun. 11, 2001 including the specification, claims, drawings and summary is incorporated herein by reference in its entirety.

What is claimed is:

1. A drive plan producing device comprising:
a contents reproducing unit which reproduces at least one of audio and video contents selected by a user;
a contents database which stores associated data including geographical point names for each of the audio and video contents;
a base contents determining unit which determines the one of the audio and video contents selected by the user as base contents used in a drive plan producing process;
a candidate place determining unit which refers to the contents database to determine the geographical point name associated with the base contents as a candidate place of driving; and
a presenting unit which presents the determined candidate place to the user.

2. The drive plan producing device according to claim 1, further comprising;
a receiving unit which receives a drive condition inputted by the user; and
an extracting unit which extracts only the candidate place that satisfies the drive condition inputted by the user.

3. The drive plan producing device according to claim 2, wherein the drive condition includes a driving time that the user inputs.

4. The drive plan producing device according to claim 2, wherein the drive condition includes at least one of a condition relating to a driving history of a user's car and a condition relating to taste of the user.

5. The drive plan producing device according to claim 1, wherein the contents database stores abstract point names associated with the contents, wherein the drive plan producing device further comprises a point table describing correspondences between the abstract point names and the geographical point names, and wherein the candidate place determining unit obtains the geographical point name corresponding to the abstract point name associated with the base contents from the point table and includes the geographical point name thus obtained to the candidate places.

6. The drive plan producing device according to claim 1, wherein the contents database stores artist names associated with the contents, wherein the drive plan producing device further comprises an artist database which stores artists and geographical points associated with the artists, and wherein the candidate place determining unit obtains the geographical points corresponding to the artist associated with the base contents from the artist database and includes the geographical points thus obtained to the candidate places.

7. The drive plan producing device according to claim 1, further comprising:
   a tour plan table representing correspondences between the candidate places and tour plans preset for areas around the candidate places, and
   a unit which obtains the tour plan corresponding to the candidate place determined by the candidate place determining unit from the tour plan table and including the tour plan into the candidate places.

8. The dive plan producing device according to claim 1, further comprising a unit which produces a tour plan including a plurality of candidate places, that exist in a predetermined range, out of the plurality of candidate places determined by the candidate place determining unit, and which represents the tour plan thus produced to the user.

9. The drive plan producing device according to claim 1, wherein the base contents determining unit determines the contents, that the contents reproducing unit is reproducing when the user inputs a drive plan producing instruction, as the base contents.

10. A navigation apparatus comprising:
    a drive plan producing device;
    a unit which receives a designation of one candidate place by a user and which searches for a route to the designated candidate place; and
    a unit which provides the user with a route guidance according to the searched route, wherein the drive plan producing device comprises:
    a contents reproducing unit which reproduces at least one of audio and video contents selected by a user;
    a contents database which stores associated data including geographical point names for each of the audio and video contents;
    a base contents determining unit which determines the one of the audio and video contents selected by the user as base contents used in a drive plan producing process;
    a candidate place determining unit which refers to the contents database to determine the geographical point name associated with the base contents as a candidate place of driving; and
    a presenting unit which presents the determined candidate place to the user.

11. An on-vehicle electronic system comprising:
    a drive plan producing device;
    a contents reproducing unit which reproduces at least one of audio and video contents selected by a user,
    wherein the drive plan producing device comprises:
    a contents database which stores associated data including geographical point names for each of the audio and video contents;
    a base contents determining unit which determines the one of the audio and video contents selected by the user as base contents used in a drive plan producing process;
    a candidate place determining unit which refers to the contents database to determine the geographical point name associated with the base contents as a candidate place of driving; and
    a presenting unit which presents the determined candidate place to the user.

12. A drive plan producing method to be executed by a navigation device having a contents database for storing associated data including geographical point names for a plurality of audio and video contents, the method comprising the steps of:
    reproducing at least one of the audio and video contents selected by a user;
    determining the one of the audio and video contents selected by the user as base contents used in a drive plan producing process;
    referring to the contents database to determine the geographical point name associated with the base contents as a candidate place of driving; and
    presenting the determined candidate place to the user.

13. The drive plan producing method according to claim 12, wherein the base contents determining unit determines the contents, that the contents reproducing unit is reproducing when the user inputs a drive plan producing instruction, as the base contents.

14. A program storage device readable by a computer, tangibly embodying a program of instructions executable by the computer to control the computer to function as a drive plan producing device comprising:
    a contents reproducing unit which reproduces at least one of audio and video contents selected by a user;
    a contents database which stores associated data including geographical point names for each of the audio and video contents;
    a base contents determining unit which determines the one of the audio and video contents selected by the user as base contents used in a drive plan producing process;
    a candidate place determining unit which refers to the contents database to determine the geographical point name associated with the base contents as a candidate place of driving; and
    a presenting unit which presents the determined candidate place to the user.

15. The program storage device according to claim 14, wherein the base contents determining unit determines the contents, that the contents reproducing unit is reproducing when the user inputs a drive plan producing instruction, as the base contents.

16. A computer data signal embodied in a carrier wave and representing a series of instructions which cause a computer to function as a drive plan producing device comprising:
    a contents reproducing unit which reproduces at least one of audio and video contents selected by a user;
    a contents database which stores associated data including geographical point names for each of the audio and video contents;
    a base contents determining unit which determines the one of the audio and video contents selected by the user as base contents used in a drive plan producing process;
    a candidate place determining unit which refers to the contents database to determine the geographical point name associated with the base contents as a candidate place of driving; and
    a presenting unit which presents the determined candidate place to the user.

17. The computer data signal according to claim 16, wherein the base contents determining unit determines the contents, that the contents reproducing unit is reproducing when the user inputs a drive plan producing instruction, as the base contents.

* * * * *